Jan. 3, 1950          H. HOUSER          2,493,247
TRIP ROPE HOLDER
Filed Jan. 16, 1948
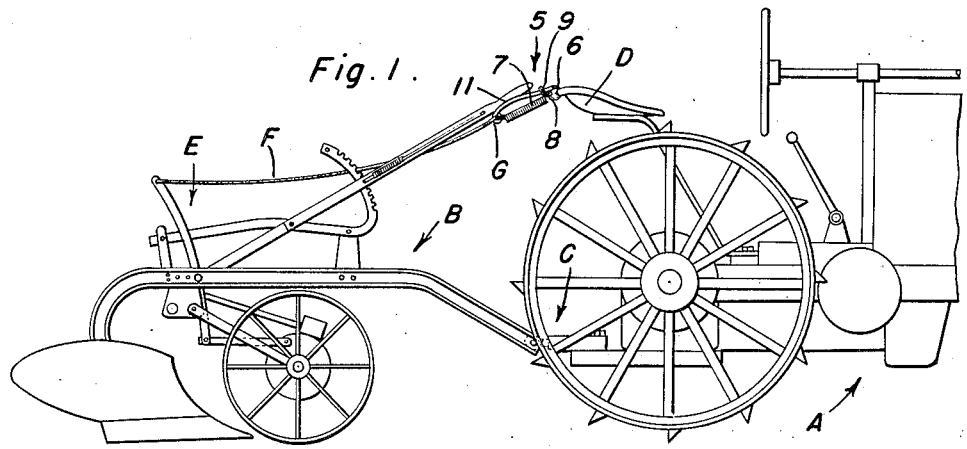
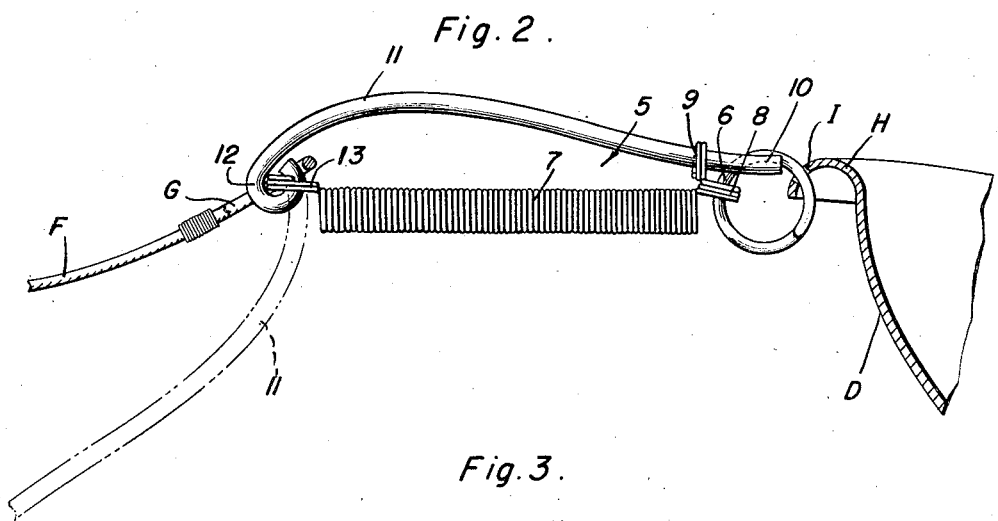
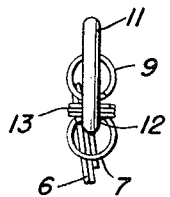
Harold Houser
INVENTOR.

Patented Jan. 3, 1950

2,493,247

UNITED STATES PATENT OFFICE 2,493,247

TRIP ROPE HOLDER

Harold Houser, Waterloo, Iowa

Application January 16, 1948, Serial No. 2,620

2 Claims. (Cl. 280—150)

The present invention relates to a novel and improved accommodation and holding device for the hand controlled end of a trip rope, the end which is ordinarily connected, in one way or another, with the customary seat on a tractor.

More specifically, the invention relates to a holder for a trip rope such as is used for controlling parts of a plow, or an equivalent agricultural machine, which is hitched to a tractor. It is a matter of common knowledge that many different types of plow hitches have been devised and used, and that, structurally, the ordinary hitch is so made that it will automatically release the plow from the tractor if and when the plow is caught or hung on an immovable rock, tree root or the like. As stated there are many different types of automatic releasing couplings provided to accomplish the stated end. For example, several types are disclosed in Patents 1,277,058 of August 27, 1918, 1,294,869 of February 18, 1919 and 1,384,195 of July 12, 1921. It is to be understood, at the outset, that I am not interested in automatic release couplings and hitches except and insofar as it seems advisable to know about same as an aid to understanding the present problem and the invention which I have devised.

My invention appertains to a holder for the hand manipulated end of a trip rope. Persons skilled in this line of endeavor are familiar with trip ropes and the purposes for which they are employed and for this reason it is not necessary to dwell upon trip ropes other than to say that it is also common in the trade to provide different kinds of holders for the end of the rope which is located adjacent the customary seat on the plow hauling tractor. For example, one type of a trip or holder, broadly similar to that which I am interested in, is disclosed in a patent to A. J. Passmel 1,786,314 of December 23, 1930.

In carrying out the principles of the invention it is my aim to structurally, functionally and otherwise improve upon trip rope holders. I have accomplished the desired ends through the medium of a simple, inexpensive and practical holder which may be connected by a ring or the like to a hole in the flange of a conventional type tractor seat where it is conveniently located for hitching of the adjacent end of the pull rope thereto and also in a position to facilitate handling of the rope by the driver of the tractor.

In reducing to practice a preferred embodiment of the invention I provide a simple coiled spring having its ends fashioned to provide accommodation eyes for a relatively rigid latch-lever, the latter being constructed to accommodate the coacting end of the rope, and serving automatically to release the rope and to avoid breakage thereof in the event that the plow is separated from the tractor as a result of the release action of the stated automatic hitch or coupling.

Other objects and advantages will become more readily apparent from the following description and the accompanying illustrative drawings.

In the drawings:

Figure 1 is a side elevational view showing a tractor, plow, any suitable hitch between the plow and tractor, showing the trip rope, and also showing the improved automatically releasable trip rope holder, the subject matter of the instant invention.

Figure 2 is an enlarged view of the rope holder disclosing the details of construction and the manner of use and operation.

Figure 3 is an end view of the rope holder seen in Figure 2 and looking at same in the direction from left to right and showing said holder detached from the driver's seat.

Referring now to the drawings by distinguishing reference characters, the tractor, which is conventional, is denoted by the reference character A and the plow, or other farm machinery, is denoted at B, the same being connected, by way of any suitable hitch means C, to the tractor. The means is not detailed but in practice is intended to be of the usual automatic overload release type. Considering further the old and well known parts, the driver's seat on the tractor is denoted by reference character D, and E denotes the structural adaptations and lever means controlled by the so-called trip rope F. The trip rope is here shown as provided with an attaching loop G which is appropriately connectible by way of my improved holder 5, with the driver's seat. As shown in Figure 2 the seat is provided with a marginal flange H having a hole or aperture I, and advantage is taken of this arrangement by supplying a split ring 6, whereby my novel holder is separably connectible with the seat.

It is believed that the holder is novel in that the principal or body portion comprises a coiled spring 7 having convolutions at one end bent to provide eye means 8 separably connected with the attaching ring 6. The terminal convolutions are also and further bent at proper angles to provide another or second eye 9 and the latter, in effect, is a keeper and serves to releasably accommodate the bill or free end portion 10 of the longitudinally bowed latch lever or hook 11. The hook is provided at its left hand end with an eye 12 which, in turn, is connected with another, a third eye 13, fashioned on the adjacent end of the spring 7. It is novel to provide a spring having two eyes 8 and 9 bent from the coils or convolutions at one end and another eye 13 at the opposite end, the latter to accommodate the pivotal connection member or eye 12 on the latch hook. It is also novel to provide any means for connecting one end of a spring to a seat, attaching a pivoted hook to the opposite end of the spring and allowing the spring to stretch so that when sufficient pull is exerted on the latch lever, the free end of the latter will be withdrawn from the keeper eye 9.

In practice the loop G on the trip cord is connected with the pivoted end portion of the latch lever or hook. Normally the bill 10 of the hook is in the keeper 9 and consequently the rope is attached by way of the holder to the seat. When, for any reason, the plow breaks loose and separates the automatic hitch C between the plow and the tractor, then, after sufficient slack in the trip rope is taken up, the rope exerts an endwise stress on the latch-lever and this in turn stretches the spring 7 until the latter elongates sufficiently to permit the free end 11 to be withdrawn and pulled out free from the eye or keeper 9. Now, the latch hook is open and the loop G on the trip rope will slide and separate therefrom.

Changes in shape, size, materials and rearrangement of details and parts may be resorted to in actual practice, so long as they do not depart from the spirit of the invention or the scope of the appended claims, as is well understood.

Having described the invention, what is claimed as new is:

1. A trip rope holder of the class shown and described comprising a relatively stiff coiled spring having endmost coils, at one end, fashioned into an eye, said eye being disposed in approximate parallelism with the longitudinal axis of the spring, a longitudinally bowed latch-lever having an eye at one end hingedly attached to said first-named eye, endmost coils at the opposite end of said spring being bent to provide one eye in approximate alignment with the first-named eye and adapted to be connected, by way of ring means, to a tractor seat, the remainder of the last-named endmost coils being then fashioned into a keeper eye, said keeper eye being at right angles to the adjacent eye and being adapted to releasably accommodate the free end portion of said latch lever.

2. A trip rope holder of the class shown and described comprising an elongated relatively stiff coiled spring, a latch-lever hingedly connected at one end to a corresponding end of said spring, said latch-lever being longitudinally bowed and adapted to occupy a position substantially parallel to said spring and being of a length greater than the spring with its free end portion extending beyond the opposite end of said spring, the last-named end of said spring having its endmost coils fashioned into two distinct eyes, one eye substantially parallel with the longitudinal axis of the spring and the remaining eye at right angles to the first-named eye and constituting a keeper, said keeper being adapted to accommodate the free end portion of said latch lever, and a split ring connected with the first-named eye and adapted to be releasably connected with a stock trip rope hole in the rim portion of a conventional tractor seat.

HAROLD HOUSER.

REFERENCES CITED

The following references are of record in the file of this patent:

UNITED STATES PATENTS

| Number | Name | Date |
|---|---|---|
| 1,294,696 | Over | Feb. 18, 1919 |
| 1,786,314 | Passmel | Dec. 23, 1930 |
| 2,478,124 | Mussman | Aug. 2, 1949 |

FOREIGN PATENTS

| Number | Country | Date |
|---|---|---|
| 195,809 | Switzerland | May 2, 1938 |